(12) United States Patent
Oren et al.

(10) Patent No.: US 8,797,840 B2
(45) Date of Patent: Aug. 5, 2014

(54) REDUNDANCY FOR STREAMING DATA IN AUDIO VIDEO BRIDGING NETWORKS

(75) Inventors: Amit Oren, Los Altos, CA (US); Yongbum Kim, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/566,484

(22) Filed: Aug. 3, 2012

(65) Prior Publication Data

US 2012/0297027 A1 Nov. 22, 2012

Related U.S. Application Data

(63) Continuation of application No. 11/860,867, filed on Sep. 25, 2007, now Pat. No. 8,254,248.

(60) Provisional application No. 60/895,788, filed on Mar. 20, 2007.

(51) Int. Cl.
*G01R 31/08* (2006.01)
(52) U.S. Cl.
USPC .......................................... 370/216; 370/252
(58) Field of Classification Search
USPC .................... 370/216, 401; 709/231
See application file for complete search history.

(56) References Cited

U.S. PATENT DOCUMENTS

| | | | |
|---|---|---|---|
| 6,760,766 B1 | 7/2004 | Sahlqvist et al. | |
| 7,099,277 B2 | 8/2006 | Sahinoglu et al. | |
| 7,742,413 B1 | 6/2010 | Bugenhagen | |
| 2003/0095553 A1 | 5/2003 | Shiomoto et al. | |
| 2003/0156543 A1 | 8/2003 | Sahinoglu et al. | |
| 2006/0230176 A1* | 10/2006 | Dacosta | 709/235 |
| 2007/0019621 A1* | 1/2007 | Perry et al. | 370/352 |
| 2007/0076727 A1* | 4/2007 | Shei | 370/401 |
| 2007/0091789 A1* | 4/2007 | Thukral | 370/216 |
| 2007/0280102 A1 | 12/2007 | Vasseur et al. | |
| 2008/0037418 A1* | 2/2008 | Cole et al. | 370/220 |
| 2008/0159304 A1* | 7/2008 | Ozugur et al. | 370/401 |
| 2008/0285459 A1 | 11/2008 | Diab et al. | |
| 2008/0285460 A1 | 11/2008 | Oren et al. | |
| 2009/0274149 A1* | 11/2009 | Williams et al. | 370/389 |

OTHER PUBLICATIONS

Newton, "Newton's Telecom Dictionary", Jan. 1998, 13th Edition, p. 891.

* cited by examiner

*Primary Examiner* — Mark Rinehart
*Assistant Examiner* — Matthew Hopkins
(74) *Attorney, Agent, or Firm* — Oblon, Spivak, McClelland, Maier & Neustadt, L.L.P.

(57) ABSTRACT

Aspects of a method and system for implementing redundancy for streaming data in audio video bridging networks are provided. Network resources may be reserved over a plurality of network paths. Reserved resources may be utilized for the transmission and/or reception of a corresponding plurality of data streams, wherein one or more of the streams may comprise redundant data. A plurality of data streams may be transmitted and/or received by a plurality of network interface hardware devices. Similarly, a plurality of data streams may be transmitted and/or received by a plurality of ports integrated into a single network interface hardware device. Each of the plurality of data streams may be assigned a unique identifier and the identifier of a first data stream may differ by one bit from an identifier of a data stream comprising data redundant to the first data stream.

21 Claims, 6 Drawing Sheets

REDUNDANCY FOR STREAMING DATA IN AUDIO VIDEO BRIDGING NETWORKS

CROSS-REFERENCE TO RELATED APPLICATIONS/INCORPORATION BY REFERENCE

This application is a continuation of co-pending U.S. Utility application having Ser. No. 11/860,867 filed Sep. 25, 2007, which makes reference to, claims priority to and claims benefit from U.S. Provisional Patent Application Ser. No. 60/895,788, filed Mar. 20, 2007, both of which are hereby incorporated herein by reference in their entirety.

FIELD OF THE INVENTION

Certain embodiments of the invention relate to audio video bridging. More specifically, certain embodiments of the invention relate to a method and system for implementing redundancy for streaming data in audio video bridging networks.

BACKGROUND OF THE INVENTION

An increasing amount of data, and in particular multimedia content, transmitted over networks has led to much research into ways to improve the quality and reliability of streaming data over bridged local area networks. Accordingly, the IEEE is in the process of standardizing a suite of protocols collectively known as Audio Video Bridging (AVB). The individual protocols include, among others, IEEE P802.1AS—IEEE Standard for Local and Metropolitan Area Networks—Timing and Synchronization for Time-Sensitive Applications in Bridged Local Area Networks, IEEE P801.1Qat—IEEE Standard for Local and Metropolitan Area Networks: Virtual Bridged Local Area Networks—Amendment 9: Stream Reservation Protocol (SRP) and IEEE P802.1Qav: IEEE Standard for Local and Metropolitan Area Networks: Virtual Bridged Local Area Networks—Amendment 11: Forwarding and Queuing for Time-Sensitive Streams.

Applications of these protocols include streaming compressed and/or uncompressed Audio and/or Video between various pieces of equipment. An exemplary transmission may comprise streaming uncompressed audio from an Audio/Video receiver to multiple Networked Speakers over an Ethernet network. In this regard, it may be necessary that the rendering of Audio in all speakers is synchronized so as not to affect the listener's experience. In this manner, the audio video bridging protocols are likely to be deployed in situations where quality of service is paramount to the user experience. However, although these protocols may enable the reliable and timely transmission of data over a fully operational network, they do not provide ways to deal with failures of network links and/or components. Ensuring the quality and reliability of transmitted multimedia data in the event of network link or component failure is critical to success in the marketplace.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for implementing redundancy for streaming data in audio video bridging networks, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for implementing redundancy for streaming data in an audio video bridging network. Aspects of the invention may enable the transmission and reception of multiple data streams, wherein one or more of the streams may comprise redundant data. In this regard, the streaming data may, for example, comprise multimedia content and the multimedia content may be rendered from multiple received streams such that packet losses and hardware failures have minimal impact on a user's experience. Aspects of the invention may enable implementing redundancy through the use of redundant network interface hardware devices and/or redundant network ports. Additionally, aspects of the invention may enable implementing redundancy in networks that utilize link aggregation protocols. In this manner, multiple data streams, wherein one or more of the streams may comprise redundant data, may traverse a network over multiple paths. In this regard, the paths may, for example, be separate from each other in that no network links are common to both paths. Also, the paths may, for example, be independent in that transmission of data via one path is not contingent on and/or dependent on the type, status, or any other characteristics of the other path.

Figure 1:
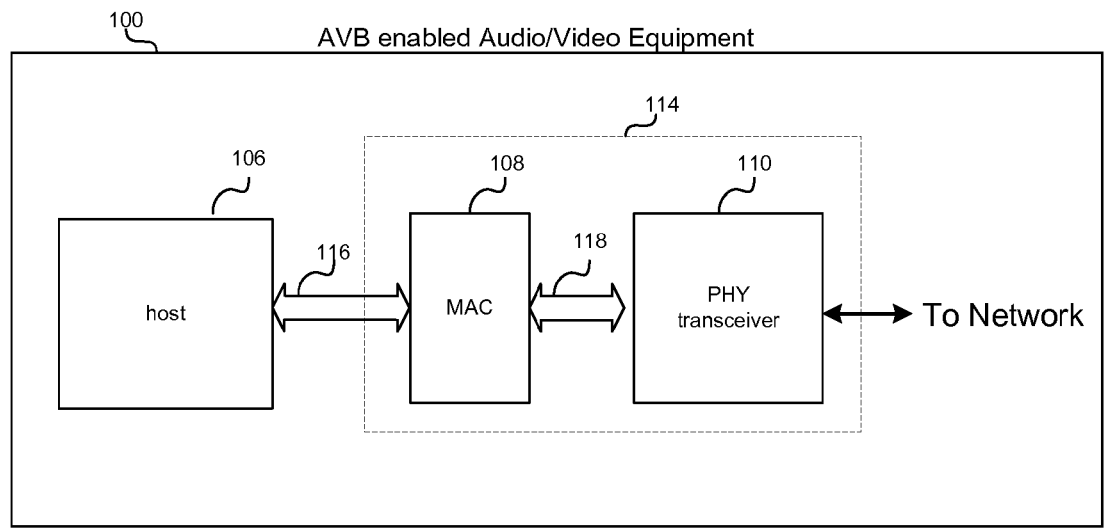
FIG. 1 is a block diagram illustrating AVB enabled Audio/Video equipment that may transmit and/or receive data over a network, in connection with an embodiment of the invention.

FIG. 1 is a block diagram illustrating an AVB enabled Audio/Video equipment that may transmit and/or receive data over a network, in connection with an embodiment of the invention. Referring to FIG. 1, there is shown AVB enabled Audio/Video equipment 100 that comprises a host 106 and a network interface hardware (NIHW) device 114. The NIHW device 114 may further comprise a medium access control (MAC) controller 108 and a transceiver 110, to enable communication over a network. In various embodiments of the invention, the network may, for example, utilize Ethernet technology and may communicate over one or more twisted pair channels. In various embodiments of the invention, the AVB enabled A/V equipment may comprise, for example, a microphone, an instrument, a sound board, a sound card, a video camera, a media player, a graphics card, or other audio and/or video device.

The transceiver 110 may comprise suitable logic, circuitry, and/or code that may enable communication, for example, transmission and reception of data, between the AVB enabled Audio/Video equipment 100 and a network. The transceiver 110 may support, for example, Ethernet operations. The transceiver 110 may enable multi-rate communications, such as 10 Mbps, 100 Mbps, 1000 Mbps (or 1 Gbps) and/or 10 Gbps, for example. In this regard, the transceiver 110 may support standard-based data rates and/or non-standard data rates. Moreover, the transceiver 110 may support standard Ethernet link lengths or ranges of operation and/or extended ranges of operation.

The data transmitted and/or received by the transceiver 110 may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical (PHY) layer, may provide services to layer 2 and layer 2 may provide services to layer 3. The data transmitted may comprise frames of Ethernet media independent interface (MII) data which may be delimited by start of stream and end of stream delimiters, for example. The data transmitted may also comprise IDLE codes that may be communicated between frames of data.

The host 106 may represent layer 3 and above, the MAC controller 108 may represent layer 2 and above and the transceiver 110 may represent the operability and/or functionality of layer 1 or the PHY layer. In this regard, the transceiver 110 may be referred to as a PHY device or a PHY transceiver, for example. The host 106 may comprise suitable logic, circuitry, and/or code that may enable operability and/or functionality of the five highest functional layers for data packets that are to be transmitted over a network. Since each layer in the OSI model provides a service to the immediately higher interfacing layer, the MAC controller 108 may provide the necessary services to the host 106 to ensure that packets are suitably formatted and communicated to the transceiver 110. During transmission, each layer adds its own header to the data passed on from the interfacing layer above it. However, during reception, a compatible device having a similar OSI stack may strip off the headers as the message passes from the lower layers up to the higher layers.

The transceiver 110 may be configured to handle all the physical layer requirements, which include, but are not limited to, packetization, data transfer and serialization/deserialization (SERDES), in instances where such an operation is required. Data packets received by the transceiver 110 from the MAC controller 108 may include data and header information for each of the above six functional layers. The transceiver 110 may be configured to encode data packets that are to be transmitted over a network and/or to decode data packets received from a network.

The MAC controller 108 may comprise suitable logic, circuitry, and/or code that may enable handling of data link layer, layer 2, operability and/or functionality in the AVB enabled Audio/Video equipment 100. The MAC controller 108 may be configured to implement Ethernet protocols, such as those based on the IEEE 802.3 standard, for example. Notwithstanding, the invention is not limited in this regard.

The MAC controller 108 may communicate with the transceiver 110 via an interface 118 and with the host 106 via a bus controller interface 116. The interface 118 may correspond to an Ethernet interface that comprises protocol and/or link management control signals. The interface 118 may be a multi-rate interface and/or media independent interface (MII). The bus controller interface 116 may correspond to a PCI or PCI-X interface. Notwithstanding, the invention is not limited in this regard.

Figure 2:
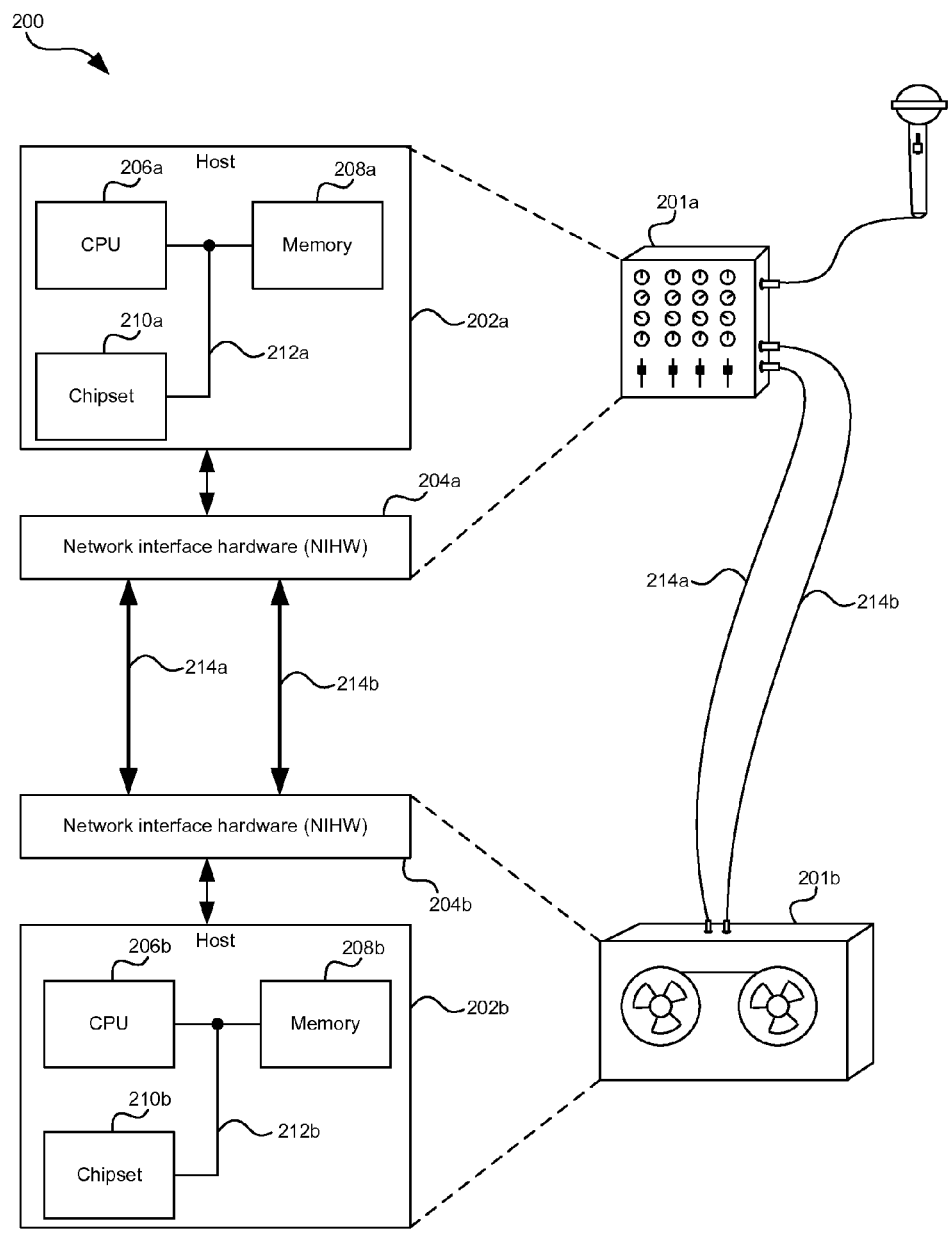
FIG. 2 is a block diagram illustrating the transmission and reception of multiple data streams, wherein one or more of the streams may comprise redundant data, to and/or from AVB enabled Audio/Video equipment, in accordance with an embodiment of the invention.

FIG. 2 is a block diagram illustrating the transmission and reception of multiple data streams, wherein one or more of the streams may comprise redundant data, to and/or from AVB enabled Audio/Video equipment, in accordance with an embodiment of the invention. Referring to FIG. 2, the network 200 may comprise network paths 214a and 214b and AVB enabled Audio/Video equipment 201a and 201b. In the exemplary embodiment shown, the AVB enabled A/V equipment may comprise a sound mixer 201a and an audio recorder 201b. Each of the AVB enabled Audio/Video equipment 201a and 201b may comprise a host 202 and a network interface hardware (NIHW) device 204. In this regard, the hosts 202a and 202b may be similar to or the same as the AVB enabled Audio/Video equipment 100 disclosed in FIG. 1. The host 202a may comprise a central processing unit (CPU) 206a, a memory 208a, and a chipset 210a. The CPU 206a, the memory 208a, and the chipset 210a may be communicatively coupled via, for example, a bus 212a. Similarly, the host 202b may comprise a central processing unit (CPU) 206b, a memory 208b, and a chipset 210b. The CPU 206b, the memory 208b, and the chipset 210b may be communicatively coupled via, for example, a bus 212b.

The hosts 202a and 202b may comprise suitable logic, circuitry, and/or code that may enable high reliability transmission and/or reception of streaming data over a network. In this regard, the host 202a and 202b may be enabled to interface with the NIHW devices 204a and 204b, respectively. In this manner, the hosts 202a and 202b may enable utilizing multiple network paths, such as the network paths 214a and 214b, to transmit and/or receive multiple data streams, wherein one or more of the streams may comprise redundant data. In this manner, the hosts 202a and 202b may enable reliable transmission, reception, and/or presentation of, for example, multimedia content in the presence of dropped/delayed packets and/or network hardware failures. Accordingly, the hosts 202a and 202b may enable the utilization and/or support of protocols such as IEEE 802.1AS to synchronize network nodes, and/or IEEE 802.1Qat to reserve resources in a network.

The CPUs 206a and 206b may comprise suitable logic, circuitry, and/or code that may enable the transmission of multiple data streams, wherein one or more of the streams may comprise redundant data, over a network. In this regard, the CPU 206a may interface with the memory 208a and/or the chipset 210a to enable transmission of multiple streams over a corresponding number of network paths. Similarly, the CPU 206b may interface with the memory 208b and/or the chipset 210b to enable transmission of multiple data streams, wherein one or more of the streams may comprise redundant data, over a corresponding number of network paths. Accordingly, the CPUs 206a and 206b may, for example, enable utilizing multiple pointers to a data buffer in order to output multiple data streams, wherein one or more of the streams may comprise redundant data. In this regard, the CPUs 206a and 206b may enable the packetization of, for example, streaming multimedia content into one or more transport streams, and may packetize the same content multiple times. Additionally, the CPUs 206a and 206b may enable assigning a unique stream identifier to each stream, and this stream ID, for example, may be placed in a header field of the transport packets. For example, the transport stream may be an MPEG transport stream and the stream ID may be carried in a "packet ID" field. Additionally, each transport packet may comprise sequencing information such as a precision clock reference, a decode timestamp, and a presentation time stamp.

The CPUs 206a and 206b may comprise suitable logic, circuitry, and/or code that may enable the reception of multiple data streams, wherein one or more of the streams may comprise redundant data. In this regard, multiple transport packets may comprise, for example, the same multimedia content. Accordingly, if a packet comprising a first stream is lost/corrupted it may be replaced with a corresponding redundant packet comprising a second stream. The CPU 206a may interface with the memory 208a and/or the chipset 210a to enable identification of multiple data streams, wherein one or more of the streams may comprise redundant data, and to enable determination of which stream's data to utilize for rendering/presentation. Similarly, the CPU 206b may interface with the memory 208b and/or the chipset 210b to enable identification of multiple data streams, wherein one or more of the streams may comprise redundant data, and to enable determination of which stream's data to utilize for rendering/presentation. In this regard, the CPUs 206a and 206b may be enabled to detect multiple data streams, wherein one or more of the streams may comprise redundant data, via the unique stream identifier assigned to each stream. Additionally, sequencing information comprising the received streams may be utilized to determine if packets have been dropped and/or corrupted from the data streams.

The memories 208a and 208b may comprise suitable logic, circuitry, and/or code that may enable storage of information regarding the networking operations and/or service applications supported by the CPU 206a and 206b and/or the chipsets 210a and 210b, respectively. Accordingly, the memories 208a and 208b may, for example, enable buffering received data and/or storing instructions that may be executed by the processor 206a and 206b and/or the chipsets 210a and 210b, respectively. Also, the memories 208a and 208b may enable buffering one or more copies of data to be transmitted. In this regard, the memories 208a and 208b may enable replicating data to support transmission of multiple data streams, wherein one or more of the streams may comprise redundant data.

The chipsets 210a and 210b may comprise suitable logic, circuitry, and/or code that may enable supporting of memory management, PCI master and arbitrator, graphics interface, I/O master for USB, audio, and/or peripheral devices, for example. In this regard, the chipset 210 may comprise at least one integrated circuit (IC) that provides services in support of the CPU 206 operations. In this regard, the chipset may, for example, enable encoding/decoding, compressing/decompressing, rendering, and/or presenting multimedia data. In some instances, the services provided by the chipsets 210a and 210b may be implemented in separate ICs. The choice of one or more ICs for implementing the chipsets 210a and 210b may be based on the number and/or type of services provided.

The NIHW devices 204a and 204b may comprise suitable logic, circuitry, and/or code that may enable acting as an interface between a network and the hosts 202a and 202b, respectively. In this regard, the NIHW devices 204a and 204b may enable receiving, for example, streaming multimedia content from the multiple network paths 214a and 214b and may enable communicating the data to the hosts 202a and 202b, respectively. Similarly, the NIHW devices 204a and 204b may enable receiving data from the hosts 202a and 202b, respectively, and transmitting the data onto multiple network paths, such as the paths 214a and 214b. Accordingly, the NIHW devices 204a and 204b may be similar to or the same as the NIHW device 114 disclosed in FIG. 1.

In an exemplary operation, the host 202b may request multimedia content from the host 202a. The hosts 202a and 202b may first synchronize to one another utilizing a standard such as IEEE 802.1AS. The host 202b may utilize a protocol such as IEEE 802.1Qat to reserve resources over each of the network paths 214a and 214b. Accordingly, the host may establish two paths over the network. In this regard, path 214a and 214b may, for example, be separate from each other in that no network links between hosts 202a and 202b are shared. Although separate paths may provide better fault protection in the event of a failure, the paths may comprise one or more common links if completely separate paths are not possible. For example, a piece of AVB enabled NV equipment may be capable of only connecting to a single physical link. Also, the two paths may, for example, be independent of each other in that transmission of data over path 214a is not contingent on and/or dependent on the type, status, or any other characteristics of the path 214b. Although independent paths may provide better fault protection in the event of a failure, certain instances may arise where completely independent paths are not possible, for example, when a piece of AVB enabled A/V equipment comprises only a single network port. Once the SRP reservations are established, the host 202a may begin transmitting two streams, stream A and stream B, onto the two paths 214a and 214b, respectively. Accordingly, the stream A and stream B may comprise essentially the same multimedia content, but may be communicated to the host 202b multiple times over different network paths. In this regard, the streams may, for example, differ in packet headers and/or dropped/corrupted packets.

The host 202b may receive the two streams and may identify the streams, for example, utilizing the unique stream ID. Accordingly, the host 202b may enable utilizing one stream as a primary stream and the other stream as a supplemental stream. For example, the host 202b may decide to utilize the stream A as the primary stream and may only utilize content from stream B when data comprising stream A is missing or corrupted. Accordingly, if a packet is missing from stream A, the host 202b may enable replacing the lost data with the corresponding redundant data comprising stream B. In this manner, as long as the same data is not lost from both streams A and B, the host 202b may be able to fully reconstruct/render the multimedia content without any loss of quality. Similarly, if there is a failure along network path 214a, the host 202b may enable recognizing the failure and may enable utilizing stream B as the primary data stream. In this manner, a complete loss of a data stream may have little or no impact on the multimedia content presented to a user by the host 202b. In this regard, sequencing information comprising the streams may be utilized to detect lost packets and/or data.

In reconstructing/rendering the multimedia content from the two data streams, the host 202b may utilize one or more timing parameters known for the network to ensure that lost and/or otherwise compromised packets will not impact the user experience. For example, if nodes along network paths 214a and 214b adhere to a standard such as IEEE 802.1Qav, then latencies may be guaranteed for each of the paths 214a and 214b. Accordingly, a minimum buffer size in the host may be determined, for example, based on the maximum and minimum delays in the network. To explain, if stream A is primary and arrives 10 ms before stream B, then at least 10 ms of stream A may need to be buffered. In this manner, if a packet is lost from stream A, the corresponding packet will arrive on stream B before the buffer under-runs and the packet is required to be rendered/presented. Although only two network paths are illustrated, the invention is not limited in this regard. Accordingly, additional network paths may be utilized to provide additional resilience to network failures.

Figure 3:
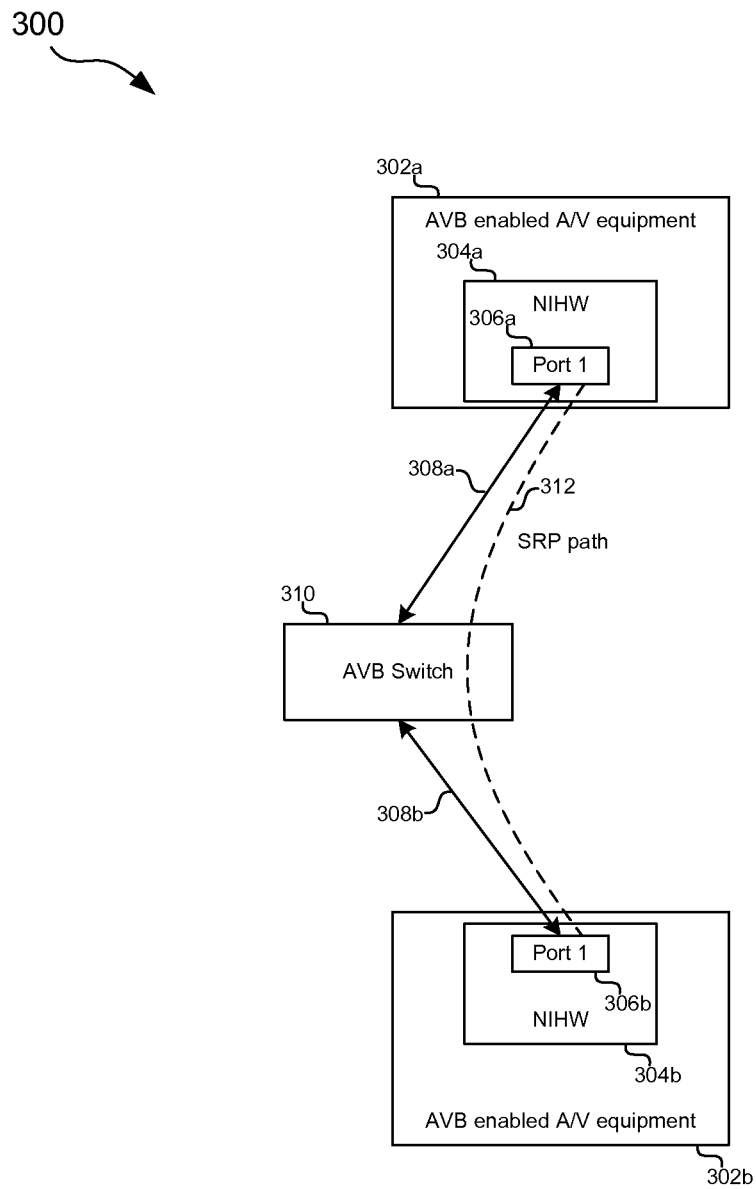
FIG. 3 is a diagram of an audio video bridged network that may enable streaming data, in connection with an embodiment of the invention.

FIG. 3 is a diagram of an audio video bridged network that may enable streaming data, in connection with an embodiment of the invention. Referring to FIG. 3, the network 300 may comprise AVB enabled Audio/Video equipment 302a and 302b, network links 308a and 308b, and an audio video bridging (AVB) switch 310.

The AVB enabled Audio/Video equipment 302a may comprise a NIHW device 304a which in turn may comprise a network port 306a. Similarly, the AVB enabled Audio/Video equipment 302b may comprise a NIHW device 304b which in turn may comprise a network port 306b. The AVB enabled Audio/Video equipment 302a and 302b and their respective NIHW devices 304a and 304b may enable transmission and reception of data over the network links 308a and 308b, respectively. In this regard, the AVB enabled Audio/Video equipment 302a and 302b may be similar to the AVB enabled Audio/Video equipment 201a and 201b disclosed in FIG. 2. Additionally, the NIHW devices 304a and 304b may be similar to the NIHW devices 204a and 204b disclosed in FIG. 2.

The ports 306a and 306b may comprise suitable logic circuitry and/or code that may enable interfacing to the network links 308a and 308b. In this regard, the links 308a and 308b may, for example, comprise copper, fiber, and/or wireless transmission media. For example, the ports 306a and 306b may enable interfacing to an eight position modular connector for an Ethernet over twisted pair (10/100/1000/10 GBase-T) network.

The audio/video bridging (AVB) switch 310 may comprise suitable logic, circuitry, and or code that may enable the reception and transmission of streaming data in applications where timing and/or high quality of service (QoS) is required. In this regard, the switch 310 may support protocols such as IEEE 802.1 as—Timing and Synchronization for Time-Sensitive Applications in Bridged Local Area Networks, IEEE 802.1Qat—Stream Reservation Protocol (SRP), and IEEE 802.1Qav—Forwarding and Queuing for Time-Sensitive Streams.

In an exemplary operation, the AVB enabled Audio/Video equipment 302b may request and subsequently receive streaming data from the AVB enabled Audio/Video equipment 302a. Prior to transmission, a protocol such as IEEE 802.1 as may be utilized to synchronize the switch 310 and the AVB enabled Audio/Video equipment 302b to the AVB enabled Audio/Video equipment 302a. Next, a standard such as IEEE 802.1Qat may be utilized to reserve resources in the switch 310. After synchronization and network setup, the AVB enabled Audio/Video equipment 302a may begin transmitting data onto the link 308a. Consequently, the data may arrive at the switch 310 and the switch 310 may forward the data onto the link 308b. In this regard, the switch may adhere to one or more standards such as IEEE 802.1Qav to guarantee a minimum quality of service for the traffic transmitted from the AVB enabled Audio/Video equipment 302a to the AVB enabled Audio/Video equipment 302b. The data may arrive at the AVB enabled Audio/Video equipment 302b where it may be rendered and/or presented to a user. In the network 300, if the switch 310, the link 308a, and/or the link 308b fail, then the data stream may cease to arrive at the AVB enabled Audio/Video equipment 302b.

Figure 4:
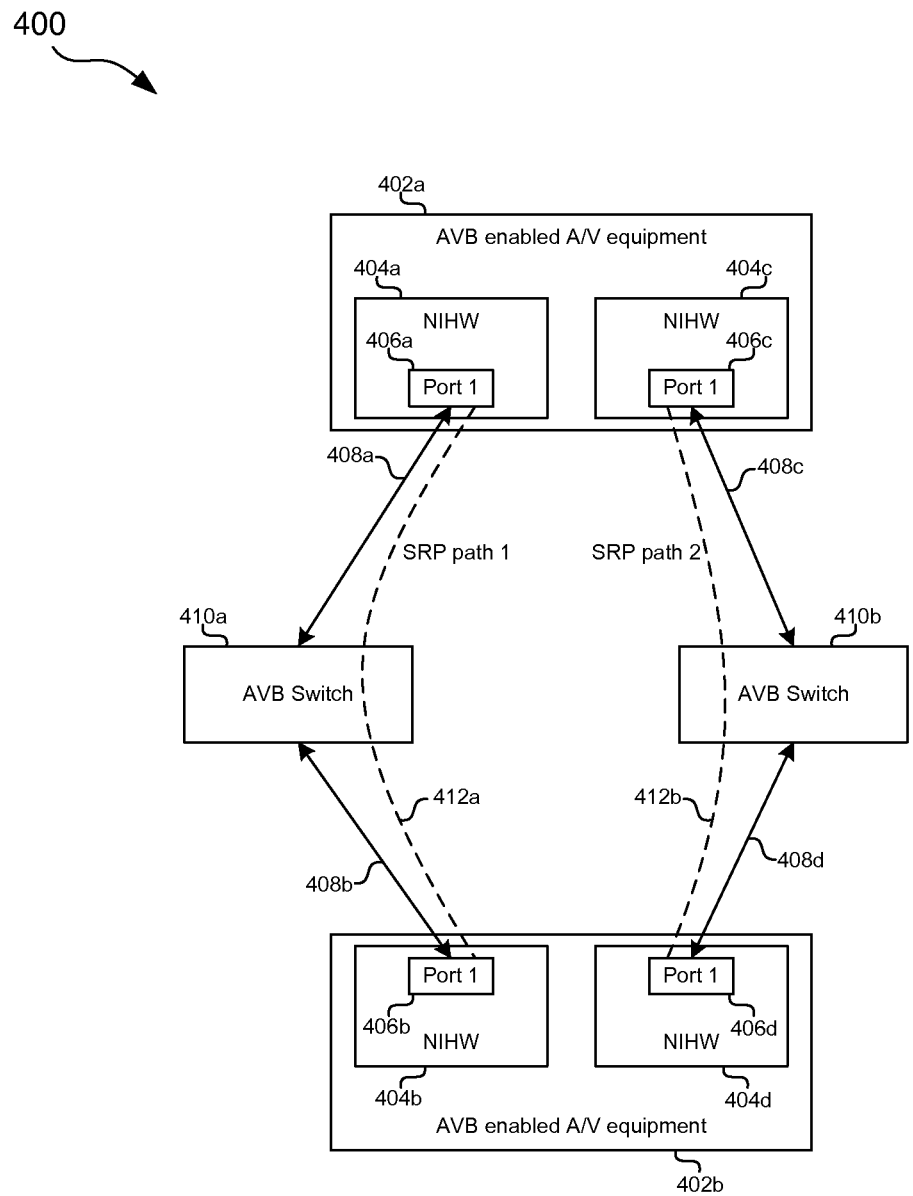
FIG. 4 is a diagram illustrating the use of redundant network interface hardware devices for streaming data in an audio video bridging network, in accordance with an embodiment of the invention.

FIG. 4 is a diagram illustrating the use of redundant network interface hardware devices for streaming data in an audio video bridging network, in accordance with an embodiment of the invention. Referring to FIG. 4, the network may comprise AVB enabled Audio/Video equipment 402a and 402b, AVB switches 410a and 410b, and network links 408a, 408b, 408c, and 408d.

The AVB enabled Audio/Video equipment 402a and 402b may be similar to the AVB enabled Audio/Video equipment 302a and 302b disclosed in FIG. 3. However, in comparison to the AVB enabled Audio/Video equipment 302a and 302b, the AVB enabled Audio/Video equipment 402a and 402b may each comprise one or more additional NIHW devices 404. In this regard, the AVB enabled Audio/Video equipment 402a and 402b may enable the transmission and/or reception of multiple data streams, wherein one or more of the streams may comprise redundant data.

The NIHW devices 404a, 404b, 404c, and 404d may be similar to or the same as the NIHW devices 304a and 304b. The AVB switches 410a and 410b may be similar to or the same as the AVB switch 310. The network links 408a, 408b, 408c, and 408d may be similar to or the same as the network links 308a and 308b.

In an exemplary operation, the AVB enabled Audio/Video equipment 402b may request and subsequently receive streaming data from the AVB enabled Audio/Video equipment 402a. However, prior to transmission of the data, a protocol such as IEEE 802.1 as may be utilized to synchronize the switches 410a and 410b and the AVB enabled Audio/Video equipment 402b to the AVB enabled Audio/Video equipment 402a. Next, a standard such as IEEE 802.1Qat may be utilized to reserve resources in the switches 410a and 410b. In this regard, a SRP reservation 412a may be initiated by the NIHW device 404b and a SRP reservation 412b may be initiated by the NIHW device 404d. Each reservation may be assigned a unique stream ID and the two SRP reservations may exist in parallel and may establish a different path across the network. Accordingly, a first stream may be communicated over a path comprising the NIHW device 404a, the link 408a, the switch 410a, the link 408b, and the NIHW device 404b. A second stream may be communicated over a path comprising the NIHW device 404c, the link 408c, the switch 410b, the link 408d, and the NIHW device 404d.

After synchronization and network setup, the AVB enabled Audio/Video equipment 402a may begin transmitting two data streams, wherein one of the streams may comprise redundant data, onto the links 408a and 408c. In order to differentiate the two streams, each of the streams may comprise a unique stream identifier. For example, the two streams may be addressed to two different multicast addresses.

The NIHW devices 404b and 404d may receive the two streams via the links 408b and 408d, respectively, and the data comprising each stream may be made available to a CPU, such as the CPU 206b, comprising the AVB enabled Audio/Video equipment 402b. Accordingly, the AVB enabled Audio/Video equipment 402b may utilize the data comprising either stream for rendering and/or presenting. In this regard, sequencing information comprising the streams may be utilized to determine if packets have been lost from either stream. In this manner, failure of one of the network links 408a, 408b, 408c, or 408d; or one of the switches 410a or 410b may not result in a loss of the data at the AVB enabled Audio/Video equipment 402b. Although only two network paths are illustrated, the invention is not limited in this regard. Accordingly, additional SRP reservations may be made over additional paths to provide increased resilience to network failures.

Figure 5:
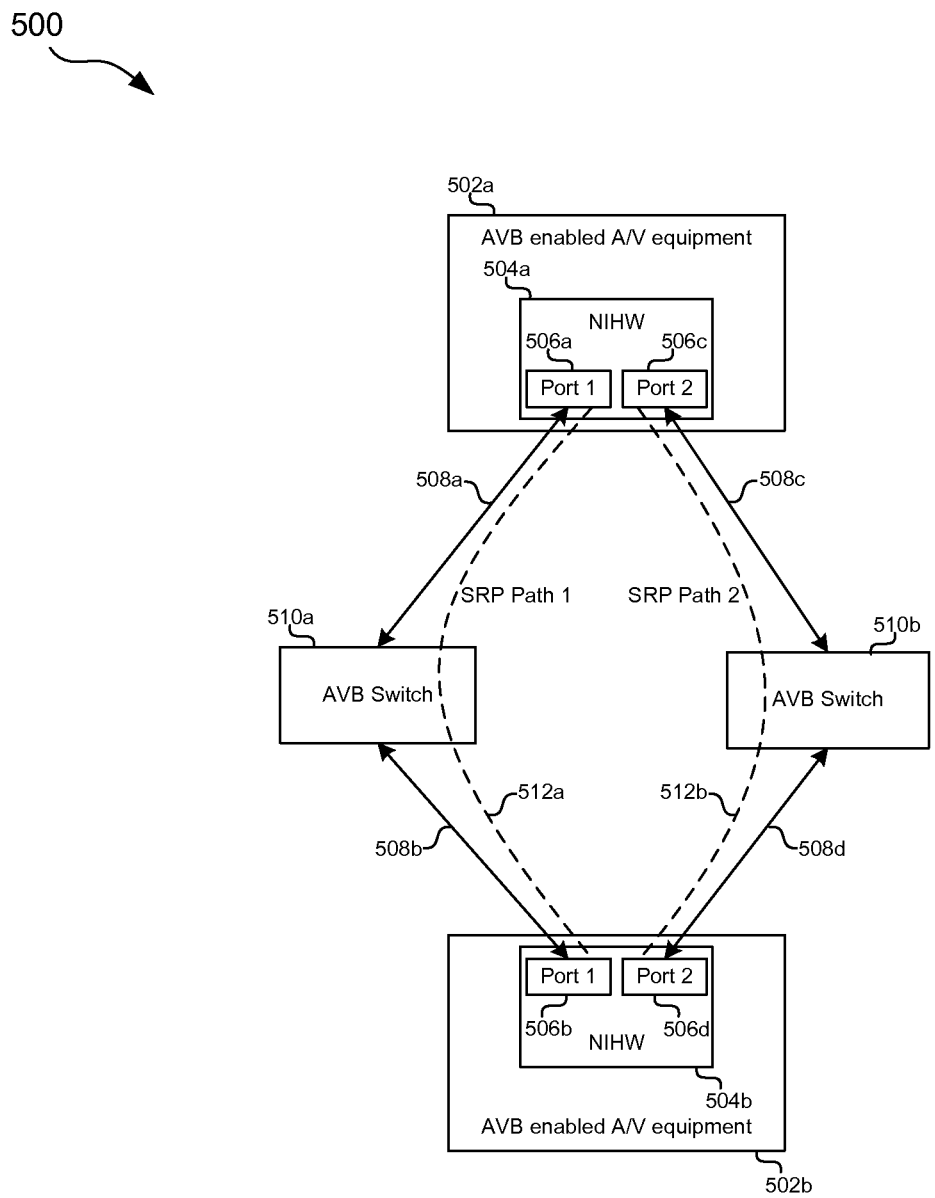
FIG. 5 is a diagram illustrating the use of redundant network ports for streaming data in an audio video bridging network, in accordance with an embodiment of the invention.

FIG. 5 is a diagram illustrating the use of redundant network ports for streaming data in an audio video bridging network, in accordance with an embodiment of the invention. Referring to FIG. 5, the network may comprise AVB enabled Audio/Video equipment 502a and 502b, AVB switches 510a and 510b, and network links 508a, 508b, 508c, and 508d.

The AVB enabled Audio/Video equipment 502a and 502b may comprise a NIHW device 504a and 504b, respectively. In this manner, the AVB enabled Audio/Video equipment 502a and 502b may be similar to the AVB enabled Audio/Video equipment 302a and 302b disclosed in FIG. 3. However, in comparison to the NIHW devices 304a and 304b, the NIHW devices 504a and 504b may comprise one or more additional network ports 506. In this regard, the AVB enabled Audio/Video equipment 502a and 502b may enable the transmission and/or reception of multiple data streams, wherein one or more of the streams may comprise redundant data.

The ports 506a, 506b, 506c, and 506d may be similar to or the same as the ports 306a and 306b. The AVB switches 510a and 510b may be similar to or the same as the AVB switch 310. The network links 508a, 508b, 508c, and 508d may be similar to or the same as the network links 308a and 308b.

In an exemplary operation, the AVB enabled Audio/Video equipment 502b may request and subsequently receive streaming data from the AVB enabled Audio/Video equipment 502a. However, prior to transmission of the data, a protocol such as IEEE 802.1 as may be utilized to synchronize the switches 510a and 510b and the AVB enabled Audio/Video equipment 502b to the AVB enabled Audio/Video equipment 502a. Next, a standard such as IEEE 802.1Qat may be utilized to reserve resources in the switches 510a and 510b. In this regard, a SRP reservation 512a may be initiated by the port 506b and a SRP reservation 512b may be initiated by the port 506d. Each reservation may be assigned a unique stream ID and the two SRP reservations may exist in parallel and may establish a different path across the network. Accordingly, a first stream may be communicated over a path comprising the port 506a, the link 508a, the switch 510a, the link 508b, and the port 506b. A second stream may be communicated over along a path comprising the port 506c, the link 508c, the switch 510b, the link 508d, and the port 506d.

After synchronization and network setup, the AVB enabled Audio/Video equipment 502a may begin transmitting two data streams, wherein one of the streams may comprise redundant data, onto the links 508a and 508b. In order to differentiate the two streams, each of the streams may comprise a unique stream identifier. For example, the two streams may be addressed to two different multicast addresses, for example.

The ports 506b and 506d may receive the two streams via the links 508b and 508d, respectively, and the data comprising each stream may be made available to a CPU, such as the CPU 206b, comprising the AVB enabled Audio/Video equipment 502b. Accordingly, the AVB enabled Audio/Video equipment 502b may utilize the data comprising either stream for rendering and/or presenting. In this regard, sequencing information comprising the streams may be utilized to determine if packets have been lost from either stream. In this manner, failure of one of the network links 508a, 508b, 508c, or 508d; or one or the switches 510a or 510b may not result in a loss of the data at the AVB enabled Audio/Video equipment 502b. Although only two network paths are illustrated, the invention is not limited in this regard. Accordingly, additional SRP reservations may be made over additional paths to provide additional resilience to network failures.

Figure 6:
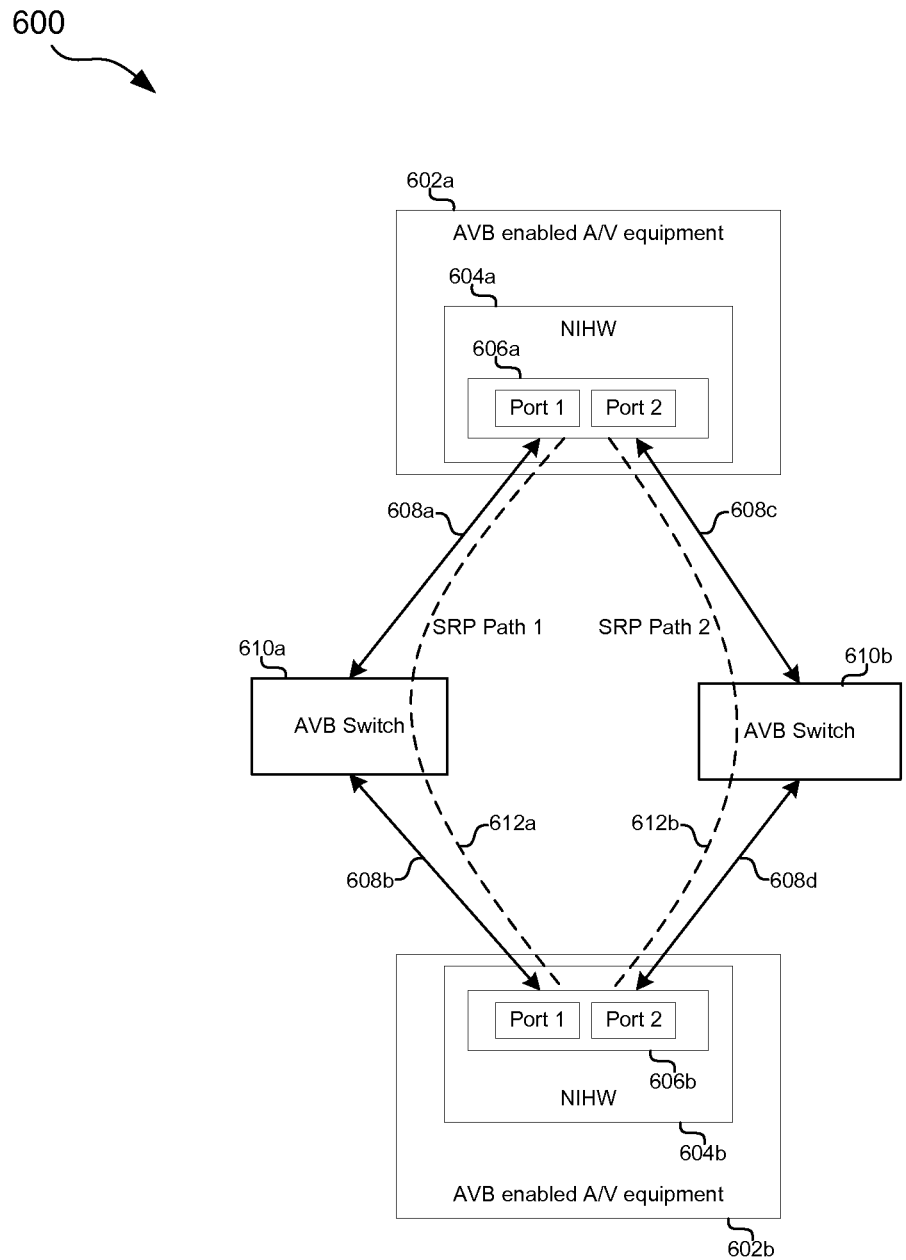
FIG. 6 is a diagram illustrating the use of multiple data streams, wherein one or more of the streams may comprise redundant data, in an audio video bridging network utilizing link aggregation, in accordance with an embodiment of the invention.

FIG. 6 is a diagram illustrating the use of multiple data streams, wherein one or more of the streams may comprise redundant data, in an audio video bridging network utilizing link aggregation, in accordance with an embodiment of the invention. Referring to FIG. 6, the network may comprise AVB enabled Audio/Video equipment 602a and 602b, AVB switch 610, network links 608a, 608b, 608c, and 608d.

The network 600 may differ from the network 500 in that link aggregation may be utilized in the connection between AVB enabled Audio/Video equipment 602a and 602b. Accordingly, the AVB enabled Audio/Video equipment 602a and 602b may comprise link aggregated ports 606a and 606b. Similarly, the switches 610a and 610b may be configured to implement link aggregation.

Link aggregation allows two network nodes to create a single logical connection to communicate over multiple network links in parallel. In this manner, the effective bandwidth is increased in a link aggregated connection. Additionally, link aggregation may make a network link more robust by providing link switch over in the event of a link failure. In this regard, if one of the aggregated physical links fails, a network node may detect the failure and may then divert traffic from the failed link to one of the parallel links. However, detection of a failed aggregated link may take too long to prevent the failure from impacting the quality of a stream.

In a link aggregated connection, a port on which to transmit data may be assigned utilizing, for example, a CRC32 hash. Accordingly, there may be instances in which the same port may be utilized to transmit multiple data streams, wherein one or more of the streams may comprise redundant data. In this manner, by assigning stream IDs that only differ by 1 bit to the streams, algorithms utilized for load balancing in link aggregated connections may reserve resources over different ports and/or paths. For example, when reserving resources for two data streams, wherein one the streams may comprise redundant data, the AVB enabled Audio/Video equipment 602b may assign a 2-bit stream ID of 00 to a first stream, and may assign a stream ID of 01 to a second stream. In this manner, the first SRP reservation may utilize a first of the link aggregated ports 606b and the second SRP reservation may utilize a second of the link aggregated ports 606b.

Aspects of a method and system for implementing redundancy for streaming data in audio video bridging networks are provided. Network resources may be reserved over a plurality of network paths. For example, the SRP reservations 412a and 412b disclosed in FIG. 4 reserve resources in the switches 410a and 410b, respectively. Reserved resources may be utilized for the transmission and/or reception of a corresponding plurality of data streams, wherein one or more of the streams may comprise redundant data. In this regard, reserved resources may, for example, comprise bandwidth in a switch, such as the switches 410a, 410b, 510a, 510b, and 610. A plurality of data streams may be transmitted and/or received by a plurality of network interface hardware devices comprising AVB enabled Audio/Video equipment. For example, the NIHW devices 404a and 404c comprising the AVB enabled Audio/Video equipment 402a in FIG. 4. Similarly, a plurality of data streams may be transmitted and/or received by a plurality of ports integrated into a single network interface hardware device. For example, the ports 506a and 506c integrated in the NIHW device 504a in FIG. 5. Each of the plurality of data streams may be assigned a unique identifier and the identifier of a first data stream may differ by one bit from an identifier of a data stream comprising data redundant to the first data stream. An AVB enabled Audio/Video equipment such as the AVB enabled Audio/Video equipment 402b or 502b may utilize latencies in the network for processing a plurality of received streams. For example, the latency information may be utilized to determine necessary buffer sizes.

Received streams may comprise sequencing information, that AVB enabled Audio/Video equipment, such as the AVB enabled Audio/Video equipment 402b or 502b, may utilize in determining which stream's data to, for example, render/present to the user.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for computer networking, the method comprising:
    in an audio video bridging network, reserving a plurality of network resources over a plurality of network paths having individual audio video bridging switches, wherein the reserving of network resources includes reserving resources of the individual audio video bridging switches for respective data streams; and
    transmitting data streams over the network paths utilizing the reserved network resources to a plurality of ports in a device, wherein each one of the data streams is transmitted to a respective one of the ports via a respective one of the audio video bridging switches, wherein the data streams comprise a data stream of media content and a supplemental redundant data stream of the same media content.

2. The method according to claim 1, comprising transmitting the data streams utilizing the ports integrated into a network interface hardware device.

3. The method according to claim 1, comprising assigning a first stream identifier to the data stream of media content; and
    assigning an additional unique stream identifier to the supplemental redundant data stream of the same media content, wherein the additional unique stream identifier differs from the first stream identifier.

4. The method according to claim 3, wherein the additional unique stream identifier differs from the first stream identifier by one bit.

5. The method according to claim 1, wherein the network paths are separate with respect to each other.

6. The method according to claim 1, wherein the network paths are independent with respect to each other.

7. A method for computer networking, the method comprising:
    in an audio video bridging network, reserving a plurality of network resources over a plurality of network paths having individual audio video bridging switches, wherein the reserving of network resources includes reserving resources of the individual audio video bridging switches for respective data streams; and
    receiving, using a plurality of ports in a device, data streams over the network paths utilizing the reserved network resources, wherein each one of the data streams is received by a respective one of the ports via a respective one of the audio video bridging switches, wherein the data streams comprise a data stream of media content and a supplemental redundant data stream of the same media content.

8. The method according to claim 7, comprising receiving the data streams utilizing the ports integrated into a network interface hardware device.

9. The method according to claim 7, comprising identifying the data stream of media content based on a first stream identifier associated with the data stream of media content; and
    identifying the supplemental redundant data stream of the same media content based on a unique stream identifier associated with the supplemental redundant data stream of the same media content, wherein the unique stream identifier differs from the first stream identifier.

10. The method according to claim 9, wherein the unique stream identifier differs from the first stream identifier by one bit.

11. The method according to claim 7, wherein the plurality of network paths are separate with respect to each other.

12. The method according to claim 7, wherein the plurality of network paths are independent with respect to each other.

13. The method according to claim 7, comprising processing the data streams based on sequencing information associated with the data streams.

14. The method according to claim 7, comprising processing the data streams based on a plurality of latencies characterizing the data streams.

15. A system for computer networking, the system comprising:
    in an audio video bridging network, circuitry that enables reserving a plurality of network resources over a plurality of network paths having individual audio video bridging switches, wherein the reserving of network resources includes reserving resources of the individual audio video bridging switches for respective data streams; and
    the circuitry enables communicating data streams over the network paths utilizing the reserved network resources to a plurality of ports in a device, wherein the circuitry enables communicating each one of the data streams to a respective one of the ports via a respective one of the audio video bridging switches, wherein the data streams comprise a data stream of media content and a supplemental redundant data stream of the same media content.

16. The system according to claim 15, wherein the circuitry enables transmitting or receiving the data streams utilizing the ports integrated into a network interface hardware device.

17. The system according to claim 15, wherein the circuitry enables assigning a first stream identifier to the data stream of media content; and the circuitry enables assigning an additional unique stream identifier to the supplemental redundant data stream, wherein the additional unique stream identifier differs from the first stream identifier.

18. The system according to claim 17, wherein the additional unique stream identifier differs from the first stream identifier by one bit.

19. The system according to claim 15, wherein the network paths are separate with respect to each other.

20. The system according to claim 15, wherein the circuitry enables identifying the data stream of media content based on a first stream identifier identifying the data stream of media content; and the circuitry enables identifying the supplemental redundant data stream based on a unique stream identifier associated with the supplemental redundant data stream, wherein the unique stream identifier differs from the first stream identifier.

21. A method, comprising:

reserving, using a first device in an audio video bridging network, a plurality of resources in the audio video bridging network, wherein the reserving of resources includes reserving resources of a first audio video bridging switch for a data stream of media content and a second audio video bridging switch for a supplemental redundant data stream of the same media content;

transmitting, using the first device in the audio video bridging network, the data stream of media content to a first port in a second device via the first audio video bridging switch in the audio video bridging network using at least a portion of the reserved resources; and transmitting, using the first device in the audio video bridging network, the supplemental redundant data stream of the same media content to a second port in the second device via the second audio video bridging switch in the audio video bridging network using at least a portion of the reserved resources.

* * * * *